United States Patent
Golob et al.

(10) Patent No.: US 10,828,670 B2
(45) Date of Patent: Nov. 10, 2020

(54) COMPONENT FOR A MOTOR VEHICLE, AND METHOD FOR PRODUCING A COATED COMPONENT FROM A MAGNESIUM MATERIAL

(71) Applicant: Dr. Ing. h.c. F. Porsche Aktiengesellschaft, Stuttgart (DE)

(72) Inventors: Silke Golob, Stuttgart (DE); Dieter Jungert, Weissach (DE); Marc-Lieven Heth, Karlsruhe (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/058,074

(22) Filed: Aug. 8, 2018

(65) Prior Publication Data
US 2019/0047018 A1 Feb. 14, 2019

(30) Foreign Application Priority Data
Aug. 11, 2017 (DE) .......................... 10 2017 118 289

(51) Int. Cl.
| | |
|---|---|
| *B05D 3/00* | (2006.01) |
| *B05D 3/12* | (2006.01) |
| *B05D 5/02* | (2006.01) |
| *B05D 7/16* | (2006.01) |
| *B60R 13/02* | (2006.01) |

(Continued)

(52) U.S. Cl.
CPC .............. *B05D 7/16* (2013.01); *B05D 3/002* (2013.01); *B05D 3/12* (2013.01); *B05D 5/02* (2013.01); *B05D 7/14* (2013.01); *B60R 13/02* (2013.01); *B60R 13/0262* (2013.01); *B05D 5/06* (2013.01); *B05D 2202/20* (2013.01);
(Continued)

(58) Field of Classification Search
None
See application file for complete search history.

(56) References Cited

U.S. PATENT DOCUMENTS

| | | | |
|---|---|---|---|
| 2005/0031856 A1* | 2/2005 | Kuo ....................... | C25D 11/08 428/336 |
| 2008/0197020 A1 | 8/2008 | Witteler et al. | |

(Continued)

FOREIGN PATENT DOCUMENTS

| | | | |
|---|---|---|---|
| CN | 102345150 A | * 2/2012 | |
| DE | 102008029580 A1 | * 12/2009 | ............. B05D 3/068 |

(Continued)

OTHER PUBLICATIONS

Machine Translation of JP 2011218598 A, Nov. 2011 (Year: 2011).*
(Continued)

*Primary Examiner* — Jeffrey A Vonch
(74) *Attorney, Agent, or Firm* — Gerald E. Hespos; Michael J. Porco; Matthew T. Hespos

(57) ABSTRACT

A component (10) for a motor vehicle has a main body (12) produced from a magnesium material. The main body (12) has a visible surface (14) with an arithmetic mean roughness Ra of 1 to 40 µm. A clear lacquer coating (40) is disposed on the visible surface (14) of the main body (12) and has a layer thickness of at most 60 µm. The clear lacquer coating (40) is applied so that the surface structure (15) of the main body (12) that is disposed below the clear lacquer coating (40) is distinguishable in a visible and haptic manner.

11 Claims, 2 Drawing Sheets

(51) Int. Cl.
*B05D 7/14* (2006.01)
*B05D 5/06* (2006.01)

(52) U.S. Cl.
CPC ...... *B05D 2350/38* (2013.01); *B05D 2401/00* (2013.01); *B05D 2501/00* (2013.01)

(56) References Cited

U.S. PATENT DOCUMENTS

| | | | | |
|---|---|---|---|---|
| 2010/0254848 | A1* | 10/2010 | Inoue | C22C 23/02 420/408 |
| 2011/0097573 | A1 | 4/2011 | Okuda et al. | |
| 2012/0009396 | A1 | 1/2012 | Sikka et al. | |
| 2012/0125487 | A1* | 5/2012 | Chen | C23C 8/80 148/276 |
| 2013/0288046 | A1* | 10/2013 | Park | C23C 28/023 428/336 |
| 2016/0222221 | A1* | 8/2016 | Saito | B32B 27/30 |

FOREIGN PATENT DOCUMENTS

| | | | | |
|---|---|---|---|---|
| DE | 10 2012 112 394 | | 6/2014 | |
| EP | 0 587 099 | | 3/1994 | |
| EP | 2 386 670 | | 11/2011 | |
| JP | 2000141995 A | * | 5/2000 | |
| JP | 2001185865 A | * | 7/2001 | |
| JP | 2001192854 A | * | 7/2001 | C23C 28/00 |
| JP | 2004027284 A | * | 1/2004 | |
| JP | 2004216803 A | * | 8/2004 | |
| JP | 2009-120877 | | 6/2009 | |
| JP | 2009120877 A | * | 6/2009 | |
| JP | 2009-262208 | | 11/2009 | |
| JP | 2011218598 A | * | 11/2011 | |
| JP | 2014034687 A | * | 2/2014 | B05D 3/068 |
| KR | 10-2009-0103360 | | 10/2009 | |
| KR | 20090103360 A | * | 10/2009 | |
| KR | 20090104575 A | * | 10/2009 | |
| WO | WO-2014175309 A1 | * | 10/2014 | C22C 23/02 |

OTHER PUBLICATIONS

Machine Translation of JP 2009262208 A, Nov. 2009 (Year: 2009).*
Powell et al., Magnesium alloys for lightweight powertrains and automotive bodies, 2012, Advanced Materials in Automotive Engineering, pp. 186-187 (Year: 2012).*
Yong et al., Synthesis and surface analysis of self-matt coating based on waterborne polyurethane resin and study on the matt mechanism, Jul. 2016, Polymer Bulletin, vol. 74, pp. 1061-1076 (Year: 2016).*
Rampinelli et al., Roughness Conversion Chart, Jan. 2018 <http://rampinelli.eu/wp-content/uploads/2018/01/Roughness-Conversion-Chart-Rampinelli.pdf> (Year: 2018).*
Predev, Surface Roughness Terminology and Parameters, Nov. 2004 <https://www.predev.com/pdffiles/surface_roughness_terminology_and_parameters.pdf> (Year: 2004).*
British Examination Report dated Mar. 28, 2019.
Japanese Office Action dated Jul. 31, 2019.
British Combined Search and Examination Report dated Jan. 3, 2019.

\* cited by examiner

COMPONENT FOR A MOTOR VEHICLE, AND METHOD FOR PRODUCING A COATED COMPONENT FROM A MAGNESIUM MATERIAL

CROSS REFERENCE TO RELATED APPLICATION

This application claims priority under 35 USC 119 to German Patent Appl. No. 10 2017 118 289.6 filed on Aug. 11, 2017, the entire disclosure of which is incorporated herein by reference.

BACKGROUND

Field of the Invention

The invention relates to a magnesium component for a motor vehicle and to a method of producing a coated component from a magnesium material.

Related Art

Components produced from magnesium are used increasingly in motor vehicles to reduce weight. Magnesium has a low density and relatively good mechanical properties as compared to alumina or steel. The components produced from magnesium material are used as exterior and interior components, for example as parts of the vehicle seats or of the instrument panel.

Magnesium components may be coated to improve anti-corrosion protection and/or improve visual appeal of components that are visible during use. The coating usually is performed by powder coating. DE 10 2012 112 394 A1 discloses a magnesium component with surfaces that that are coated by thermal spraying to provide anti-corrosion protection.

Magnesium components or predefined surfaces of the magnesium components that have received these types of coatings have the disadvantage that the metallic surface below the coating no longer is distinguishable in a haptic and visual manner.

It is therefore an object of the invention to provide a component that is produced from magnesium and a method for producing said component so that the component has an anti-corrosion protection and so that the metallic surface of the component is distinguishable in a visual and haptic manner.

SUMMARY

The component of the invention has a main body produced from a magnesium material. The main body has a visible surface with an arithmetic mean roughness Ra of usually 1 to 40 µm. The mean roughness Ra describes the roughness of a technical surface that has been produced, for example, by subtractive machining, master forming processes, or forming processes. The arithmetic mean roughness Ra is determined by a method that includes: determining differences in height and depth of the rough surface along a measured distance, by calculating a specific integral of the determined roughness profile on the measured distance, and finally dividing the determined result by the length of the measured distance.

A clear lacquer coating is disposed on the visible surface of the main body. The clear lacquer coating has a layer thickness of at most 60 µm and serves as an anti-corrosion protection of the main body produced from a magnesium material.

In one embodiment, a bi-component clear lacquer that has a base lacquer and curing agent is used as the clear lacquer. As compared to a single component clear lacquer, the bi-component clear lacquer is more resistant to chemical substances and permits thin layers. The clear lacquer can be a wet lacquer, a powder lacquer, a hybrid lacquer, or as a sol-gel system, and can be applied by spraying, flooding, dipping, or powder coating. The clear lacquer in certain embodiments is configured to be heat-curing, UV-curing, or heat/UV-curing.

The metallic visible surface of the main body is distinguishable in a visual and haptic manner despite the presence of the coating due to the layer thickness of the clear lacquer coating that is thin in comparison to thickly applied coatings, and due to the visual and mechanical properties of the clear lacquer coating. Thus, the magnesium characteristic of the component can be experienced.

The clear lacquer coating may have a layer thickness of 20 to 40 µm. As a result, the surface structure of the visible surface is particularly well distinguishable in a visual and haptic manner. However, a smaller layer thickness of approx. 5 µm is possible in the case of comparatively new lacquer systems.

The clear lacquer coating in one embodiment has a clear lacquer surface with an arithmetic mean roughness Ra of at least 0.5 µm. The surface structure of the clear lacquer surface herein corresponds largely to the surface structure of the visible surface. Thus, the metallic surface of the main body can still be substantially experienced in a visual and haptic manner despite the coating.

The main body is preferably a magnesium casting. Thus, complex geometries of the main body are producible by casting the main body. A magnesium casting material often is AZ91, which is a magnesium die-casting alloy composed of magnesium, aluminum, zinc, and manganese. The magnesium alloy AZ91 has a high strength, very good casting properties, and a comparatively high resistance to corrosion. The main body alternatively can be a magnesium sheet or an extruded magnesium profile.

The component in one embodiment is a visible motor-vehicle interior component. The component can be a design element or a supporting element such as, for example, a center console. Alternatively, the component can be used as a motor-vehicle exterior part.

The invention also relates to a method for producing a coated component from a magnesium component so that the metallic surface of the component is distinguishable in a visual and haptic manner despite the coating.

The method comprises the following method steps:
a) machining a visible surface of the component by blasting, and
b) applying a clear lacquer coating to the visible surface that has been machined by blasting.

The visible surface after primary forming, for example extruding, has a non-homogenous surface structure with peaks and troughs of various heights and depths. Moreover, streaks and discolorations that result from, or are created by the flows of the melt in the casting process, by the cooling procedures, and by the release agents used in the casting process often are created in the production procedure, for example when die-casting the main body. The non-homogenous surface structure is compacted by blasting the visible surface, and the streaks and discolorations are attenuated or removed such that a homogenous metallic surface of the main body is present after blasting. Additionally, other pre-treatments of the component, for example for deburring, cleaning, passivating the component, can be performed prior to the application of the clear lacquer coating.

The blasting can be performed, for example, by pressure blasting or by wheel blasting. In the case of wheel blasting, blasting elements fed into a wheel are accelerated by the rotation of the wheel, and the accelerated blasting elements are ejected onto the visible surface of the main body in a widely spread jet blast.

The blasting method is quantified by an Almen intensity measurement that determines the jet intensity of blasting. An Almen test strip is produced from a spring steel and is blasted during the blasting process. The accumulated blasting intensity is determined by way of the flexing of the Almen test strip. Three different test strips, type N, type A, or type C can be used for the Almen intensity measurement. These different test strips vary in terms of the sheet thickness, with the sheet thickness increasing from type N.

In the present exemplary blasting process, a type N test strip is used, and the test strip preferably flexes in the range between 0.1 and 0.42 mm.

After blasting, the visible surface that has been prepared by the blasting is coated with a clear lacquer. More particularly, a thin layer of the clear lacquer is applied to the visible surface. The layer thickness of the clear lacquer coating is at most 60 µm such that the surface structure of the blasted and homogenous visible surface continues to be distinguishable in a visual and haptic manner.

The blasting elements are preferably aluminum pellets, for example aluminum wire pellets. The aluminum pellets usually used are for cleaning, compacting, and levelling thin-walled components and enable the thin-walled components to be blasted without distortion by the aluminum pellets. Thus, thin design elements that are produced from a magnesium material also can be blasted. Moreover, the gloss grade of the visible surface is increased by the blasting with the aluminum pellets.

In one embodiment the aluminum pellets have a diameter of 0.3 to 3.0 mm to generate a fine and homogenous surface structure on the visible surface.

The clear lacquer preferably has a matting agent and/or a tinting agent so that a matte metallic visible surface is achieved despite the clear lacquer coating. The clear lacquer surface when measured for gloss grade can display 30 to 60 gloss units, for example, where the measurement is performed at an angle of 60°.

An exemplary embodiment of the invention will be explained in more detail by means of the drawings.

DETAILED DESCRIPTION

Figure 1:
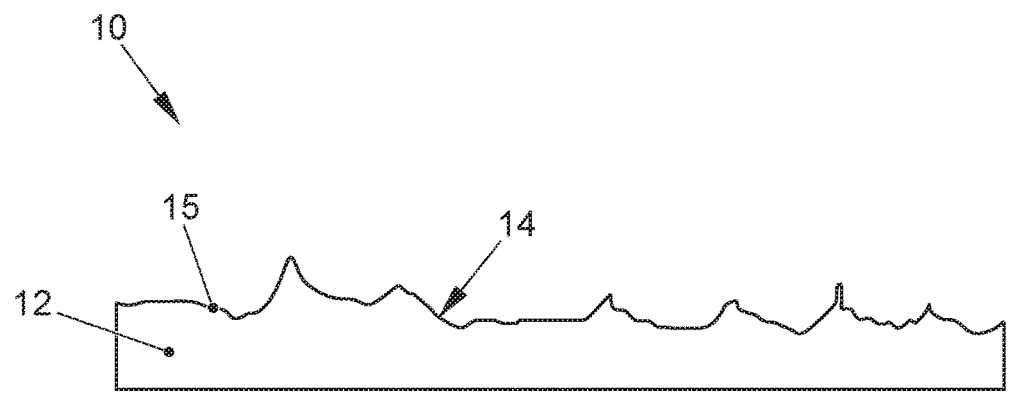
FIG. 1 schematically shows a main body of the component after primary forming.

FIG. 1 shows a main body 12 of a component 10 to be coated. The main body 12 is produced from a magnesium material, for example AZ91, and has a visible surface 14 that is visible in the installed state of the component. The visible surface 14 has a non-homogenous surface structure 15 that has been created after the primary forming process. The surface structure 15 has troughs and peaks of various depths and heights, respectively. Moreover, the visible surface 14 has streaks and discolorations that have been created, for example, by release agents used in the die-casting process and/or by flows of the melt in the die-casting process.

Figure 2:
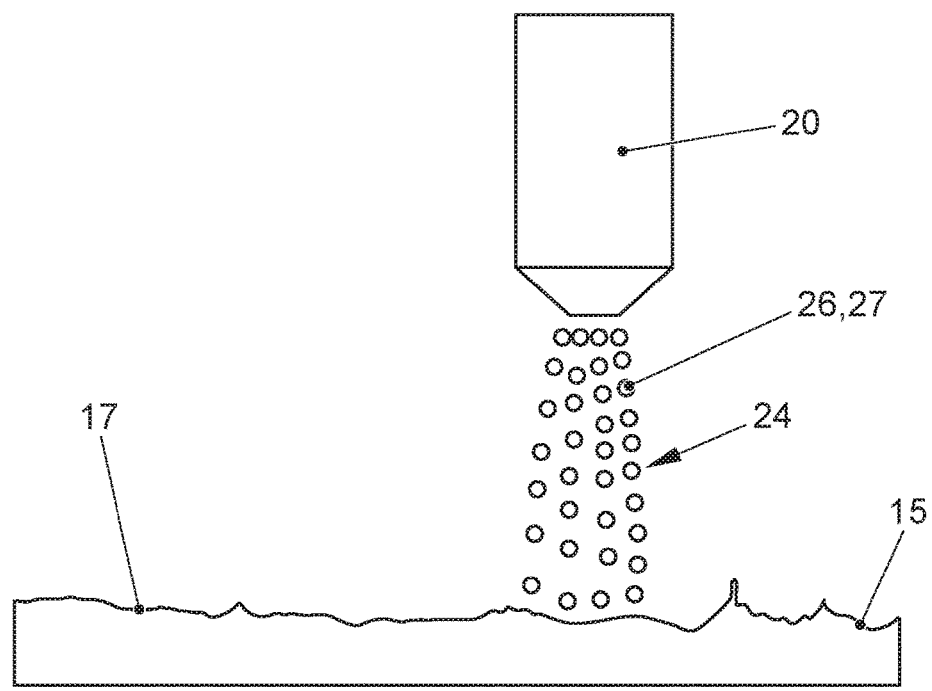
FIGS. 2 and 3 schematically show the individual method steps of the method for producing a coated component from a magnesium material.

FIG. 2 shows the first method step for producing a coated component 10 from magnesium material. The visible surface 14 of the main body 12 is blasted in this step by a blasting device 20, for example a pressure blasting or a wheel blasting device. The blasting device 20 aligns a blasting jet 24 with the visible surface 14 to propel a multiplicity of blasting elements 26 onto the visible surface 14. The blasting elements 26 are aluminum pellets 27 with a diameter of 0.6 to 1.0 mm and, by virtue of the mechanical properties thereof, clean, compact, and level the visible surface 14.

The non-blasted non-homogenous surface structure 15 is illustrated on the right of the blasting device 20 in FIG. 2, and a blasted surface structure 17 of the visible surface 14 is to the left of the blasting device 20. In contrast to the non-blasted surface structure 15, the blasted surface structure 17 has a finer, more compact and cleaned surface structure with an arithmetic mean roughness Ra of 2 to 6 µm.

Figure 3:
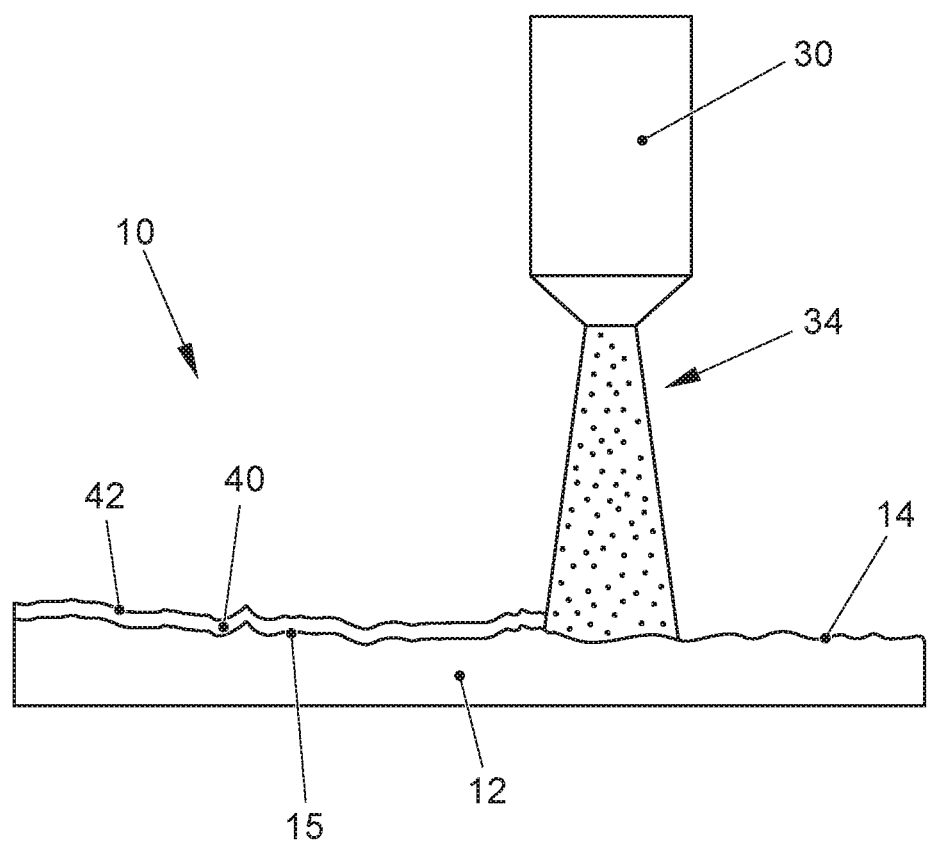

FIG. 3 shows the second method step for producing a coated component 10 from a magnesium material. The blasted surface structure 17 of the visible surface 14 is coated with a clear lacquer coating 40 in the second method step. The coating process is performed by a painting device 30 that produces a lacquer jet 34 aligned with the visible surface 14. A clear lacquer surface 42 that has the clear lacquer coating 40 is depicted to the left of the painting device 30, and the blasted surface structure 15 is depicted to the right of the painting device 30

The clear lacquer coating 40 has a layer thickness of 30 µm, and the clear lacquer surface 42 has an arithmetic mean roughness Ra of 1.5 µm. On account of the clear lacquer coating 40 of this type the metallic visible surface 14 that is covered by the clear lacquer coating 40 is distinguishable in a visual and haptic manner.

Constructive embodiments other than the embodiments described are within the scope of the invention.

What is claimed is:

1. A visible interior component of a motor vehicle, comprising:
    a main body made from a magnesium material, the main body having a visible surface with a surface structure having an arithmetic mean roughness Ra of 2 to 6 µm; and
    a clear lacquer coating disposed on the visible surface of the main body, the clear lacquer coating having a layer thickness of at most 60 µm, wherein the surface structure of the main body that is disposed below the clear lacquer coating is distinguishable visually through the clear lacquer coating, the clear lacquer coating having a surface structure with an arithmetic mean roughness Ra of 0.5 to 1.5 µm so that the surface structure of the clear lacquer coating is distinguishable in a haptic manner, and the clear lacquer coating having a finish that displays 30 to 60 gloss units where the measurement is performed at a 60° angle.

2. The visible interior component of claim 1, wherein the layer thickness of the clear lacquer coating is 5 to 40 µm.

3. The visible interior component of claim 1, wherein the clear lacquer coating has a matting agent and/or a tinting agent.

4. The visible interior component of claim 1, wherein the magnesium material is an alloy composed of magnesium, aluminum, zinc, and manganese.

5. The visible interior component of claim 1, wherein the magnesium material producing the main body is a magnesium casting.

6. The visible interior component of claim 1, wherein the visible interior component is a center console.

7. A method for producing the visible interior component of claim 1, comprising:
- providing the main body made from the magnesium material having the visible surface,
- blasting the visible surface of the main body using blasting elements forming the surface structure of the main body, and
- applying the clear lacquer coating to the visible surface that has been machined by the blasting elements.

8. The method of claim 7, wherein the blasting elements are aluminum pellets.

9. The method of claim 8, wherein the aluminum pellets have a diameter of 0.6 to 1 mm.

10. The method of claim 7, wherein the step of blasting comprises pressure blasting or wheel blasting.

11. The method of claim 7, wherein the step of providing the main body comprises die-casting or extruding the magnesium material.

\* \* \* \* \*